March 11, 1969  R. L. MARTIN  3,431,998
VEHICLE SAFETY MECHANISM
Filed June 27, 1967

INVENTOR.
Robert L. Martin
BY
Yount, Raney, Flynn and Taralli
ATTORNEYS

United States Patent Office 3,431,998
Patented Mar. 11, 1969

3,431,998
VEHICLE SAFETY MECHANISM
Robert L. Martin, Detroit, Mich., assignor to Eaton Yale & Towne Inc., Cleveland, Ohio, a corporation of Ohio
Filed June 27, 1967, Ser. No. 649,251
U.S. Cl. 180—112
Int. Cl. B60j 5/00
8 Claims

ABSTRACT OF THE DISCLOSURE

A vehicle safety latch mechanism is attached to a vehicle and operates to prevent a door thereof from moving to the open position in the event of a crash. The assembly includes an elongated member movable from an unlatched position to a latched position for spanning the space between the door and the vehicle body for maintaining the door in the closed position when the vehicle encounters a crash condition. The latch mechanism also includes a first explosive means for moving the elongated member to the latched position when the crash condition is encountered and a second explosive means for subsequently returning the elongated member to the unlatched position whereby the door may be opened after the crash.

---

The present invention relates to a vehicle latch mechanism and particularly relates to a vehicle latch mechanism operable to hold the door of a vehicle in a position blocking the door opening during a crash and which releases to provide for opening of the door after the crash.

A significant contributing factor to injuries in automobile accidents is the ejection of occupants from the automobile during an accident. Such ejection occurs when the door or doors of the automobile open during the accident. The normal door locking mechanisms utilized to retain the doors of an automobile in the closed position include components disposed on the door and coacting components disposed on the vehicle body. During the crash of a vehicle, however, the body and/or doors are deformed so that the coacting components of the normal locking mechanism are separated and allow the door to move to the open position. Moreover, the normal locking mechanism may release due to the force of the occupant hitting the door. A solution to these problems is disclosed and claimed in copending application 649,250 filed June 27, 1967, in the name of David P. Hass and assigned to the assignee of the instant invention.

The instant invention is an improvement on the invention disclosed and claimed in the above application. In the above-mentioned application there is disclosed an assembly including an elongated member which is moved by an explosive means to a position coacting with the door and the body to prevent the door from opening in the event a crash condition is encountered. The elongated member is moved as a result of the activation of the explosive means which is in turn activated by a sensing means which sends a signal to the explosive means in response to a predetermined operating condition of the vehicle such as impact, deceleration, or the like. After the crash is over, however, it is frequently difficult to move the elongated member to the unlatched position so that the door may be opened to allow exiting from the vehicle.

Accordingly, an important object of this invention is the provision of a vehicle safety latch mechanism which coacts between the door and the body of a vehicle to prevent the door from moving to an open position during a crash in which the normal door locking mechanism may become inoperative and which includes means for moving latch member into a position holding the door in a closed position and for subsequently returning the latch member to an unlatched position after the crash is over.

Another object and feature of this invention is to provide a vehicle safety latch mechanism, as noted in the next preceding object, and including a first explosive means for moving the elongated member to a position to hold the door in the closed position during the crash and a second explosive means to return the elongated member to the unlatched position whereby the door may be opened.

In general, these and other objects and features of this invention are attained in the preferred embodiment which includes a first housing adapted to be attached to the body of the vehicle and a second housing adapted to be attached to the door of a vehicle. An elongated member, which includes a piston, is slidably disposed in the first housing. A first explosive means is disposed within the first housing so that upon detonation thereof the elongated member is moved to an extended position and into the second housing disposed on the door. A second explosive means is disposed in the second housing, and is detonated to move the elongated member back to the initial position within the first housing so that the door may be opened. An appropriate means is included for sequentially activating the first and second explosive means.

Other objects and advantages of the present invention will be readily appreciated as the same becomes better understood by reference to the following detailed description when considered in connection with the accompanying drawings wherein.

Figure 1:
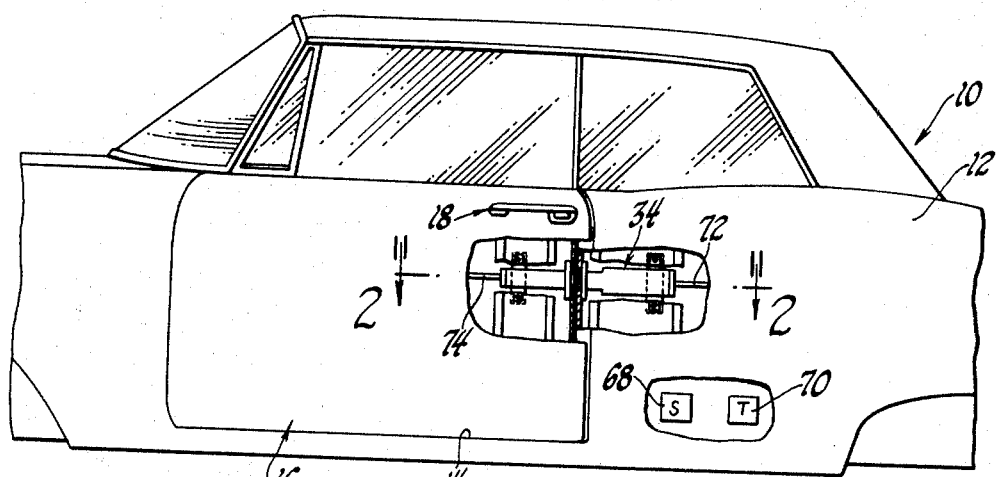
FIG. 1 is a fragmentary view of a vehicle incorporating a preferred embodiment of the instant invention.

Referring now to the drawings, wherein like numerals indicate like or corresponding parts throughout the several views, a vehicle assembly is generally shown at 10 in FIG. 1. The vehicle 10 includes a body 12 having a door opening 14 therein. A closure means comprising the door 16 is operatively attached to the body 12 by hinges, or the like, and is movable between a closed position, as illustrated in FIG. 1, for blocking the opening 14, and an open position for allowing movement into and out of the body 12 through the opening 14. A normal door locking mechanism of a type well known in the prior art is generally indicated at 18.

Figure 2:
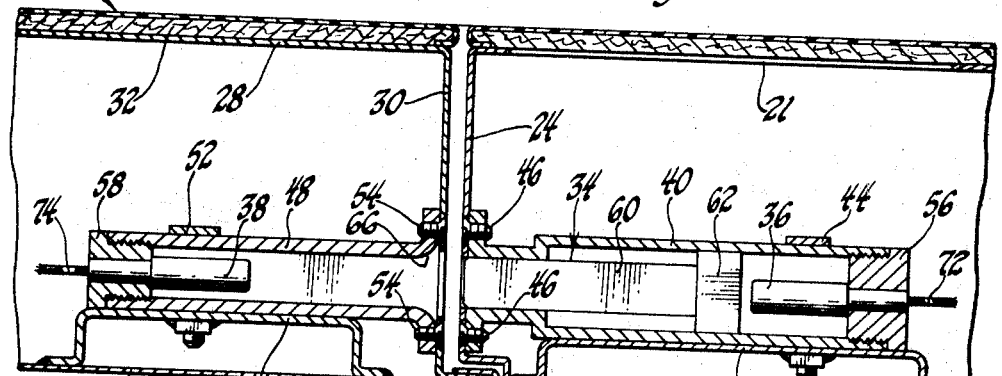
FIG. 2 is an enlarged cross-sectional view taken substantially along line 2—2 of FIG. 1.
Figure 3:
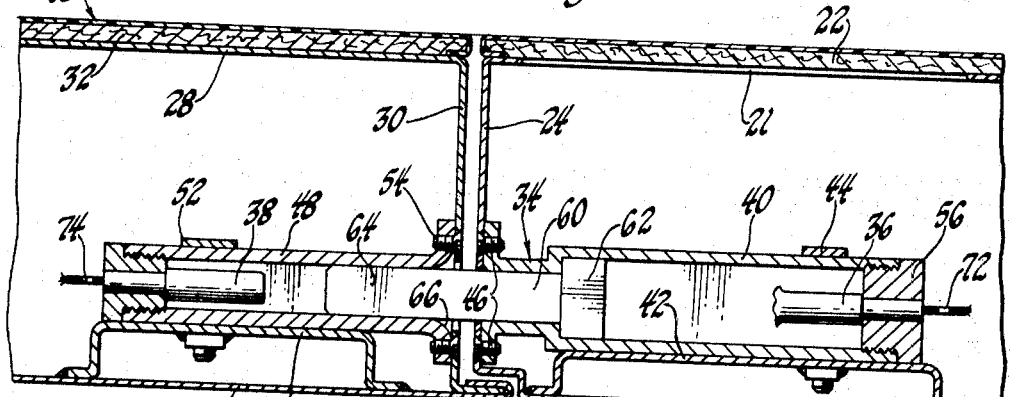
FIG. 3 is an enlarged cross-sectional view similar to FIG. 2 but showing a different position of parts thereof.

As illustrated in cross section in FIGS. 2 and 3, the body 12 has an exterior wall 20 and an interior wall 21 which supports decorative or padding material 22. An inwardly extending flange 24 interconnects the walls 20 and 21.

The door 16 includes an outer wall 26, an inner wall 28 and an interconnecting end wall 30. The door 16 also includes decorative or padding material 32 disposed on the inner wall 28.

A latch means is generally indicated at 34 and is operable between an unlatched condition, as illustrated in FIG. 2, and a latched condition, as illustrated in FIG. 3, or coating with the door 16 and the body 12 for preventing the door from moving to the opened position in the event the door becomes substantially laterally spaced from the body 12. There is also included actuation means comprising first and second explosive means 36 and 38, respectively. The explosive means 36 operates the latch means to the latched condition, and the explosive means 38 retains the latch means to the unlatched condition so that the door 16 may be moved to the open position.

More specifically, the assembly includes a first housing 40 which is attached to the wall 20 of the body 12 by the bracket 42, the strap 44, and the bolts 46. A second housing 48 is attached to the door 16 by the bracket 50, the strap 52, and the bolts 54. A threaded plug 56 is threadedly engaged in the end of the housing 40 and supports the first explosive charge 36. A similar plug 58 is threadedly engaged with the housing 48 and supports the second explosive charge 38.

An elongated member 60 includes a piston portion 62 and a smaller elongated portion 64. The enlongated member 60 is slidably disposed in the housing 40 for movement from the unlatched position, as shown in FIG. 2, to the latched position, as shown in FIG. 3. The housing 48 has rounded corners, as indicated at 66, to guide the elongated member 60 thereinto in the event of slight misalignment.

A sensing means 68 and a timing means 70 operates to activate the first explosive charge 36 and to thereafter activate the second explosive charge 38. The sensing means 68 may be an accelerometer, inertia switch, or the like, which is sensitive to a predetermined operating condition of the vehicle. An example of such a sensing means is disclosed in copending application Ser. No. 562,289, filed July 1, 1966, in the names of Sidney Oldberg and William R. Carey and assigned to the assignee of the instant invention. If an accelerometer is utilized as the sensing means 68, a signal is sent from the sensing means 68 through the lead 72 to the first explosive charge 36 when the vehicle is subjected to a predetermined deceleration, as occurs during the initial phase of a crash. The explosive charge 36 is thus activated to move the elongated member to the left, as illustrated in the drawings, and into the housing 48. The detonation or activation of the explosive charge 36 occurs before any deformation of the door 16 or body adjacent thereto occurs. In the embodiment illustrated, the timing means 70 is activated when the sensing means 68 sends a signal to the explosive charge 36.

While the elongated member is in the latched position as illustrated in FIG. 3 the crash is taking place, and in the event a substantial lateral space results between the door 16 and the body 12 so that the normal door locking mechanism is inoperative, the elongated member 60 will span the space to maintain the door 16 in the closed position. After the accident is over, the timing means 70 sends a signal through the lead 74 to activate or detonate the explosive charge 38 which in turn moves the elongated member back to the unlatched position, thus allowing the door 16 to be opened. As an alternative, instead of using a timing means 70, a manually actuated switch may be utilized to activate the explosive charge 38.

Having described my invention, I claim:

1. A vehicle safety mechanism for securing a closure member of an automotive vehicle in a position blocking the closure opening in the vehicle body member in the event the vehicle encounters a crash condition and for releasing the closure after the crash comprising sensing means for sensing the crash condition, a latch member carried by one of said members and movable from an unlatched position relative to said one member into a latched position in latching engagement with the other of said members, first explosive means responsive to said sensing means sensing said crash condition for moving said latch member into said latched position, and second explosive means for returning said latch member toward its unlatched position after the crash.

2. A vehicle safety mechanism as defined in claim 1 wherein said latch member is slidably supported in a housing carried by said vehicle body member and said first explosive means is supported in said housing and ignited by said sensing means, and timing means for activating said second explosive means for returning said latch member a predetermined time period after activation of said first explosive means.

3. In a vehicle, a vehicle body member having an opening, a closure member for said opening movable between an open and a closed position, a closure latch means operatively associated with said closure and body members to hold said closure member closed, and a safety latch mechanism independent of said closure latch means and operatively associated with said closure member and said body member and operable to secure said closure member in a position blocking said opening in the event the vehicle encounters a crash condition, said safety latch mechanism including a latch member movable from a first unlatched position to a second latched position wherein said member holds said closure member in a position blocking said opening and then movable back toward said first unlatched position to release said closure member for opening movement, and one explosively actuated means for moving said latch member toward said first unlatched position.

4. In a vehicle as defined in claim 3, another explosive means for moving said latch member to said second latched position.

5. In a vehicle as defined in claim 4, means for activating said another explosive means and for thereafter activating said one explosive means, and wherein said latch member comprises an elongated member for spanning space between said vehicle body member and said closure member.

6. In a vehicle as defined in claim 5, a first housing attached to one of said body and said closure members, said elongated latch member being slidably disposed in said first housing, said another explosive means being disposed in said first housing for extending said elongated latch member from said first housing and to said second position upon activation thereof, and a second housing attached to the other of said body and closure members for receiving said elongated latch member as the latter is moved to said second position, said one explosive means being disposed in said second housing for moving said elongated latch member toward said unlatched position upon activation thereof.

7. In a vehicle as defined in claim 6 wherein said means for activating said another explosive means includes sensing means for activating said another explosive means in response to a predetermined operating condition of said vehicle.

8. In a vehicle as defined in claim 7, timing means for activating said one explosive means a predetermined time period after the activation of said another explosive means.

References Cited

UNITED STATES PATENTS

| 2,344,826 | 3/1944 | Le Gresley. | |
| 2,780,961 | 2/1957 | Musser et al. | 60—26.1 X |
| 2,826,444 | 3/1958 | Kurilenko. | |
| 2,828,151 | 3/1958 | Brotman et al. | 180—112 X |
| 2,850,291 | 9/1958 | Ziccardi | 280—150 |
| 2,971,729 | 2/1961 | Martin | 244—122 |
| 2,974,742 | 3/1961 | Tyler | 180—113 |
| 3,024,592 | 3/1962 | Leaman | 244—122 |
| 3,151,698 | 10/1964 | Pollock | 180—113 |

KENNETH H. BETTS, Primary Examiner.

U.S. Cl. X.R.

292—144, 254; 244—135